United States Patent
Nakao et al.

[15] 3,652,395
[45] Mar. 28, 1972

[54] METHOD FOR THE PRODUCTION OF 5'-NUCLEOTIDES

[72] Inventors: Yoshio Nakao, Ibaraki; Mitsuzo Kuno, Suita, both of Japan

[73] Assignee: Takeda Chemical Industries, Ltd., Osaka, Japan

[22] Filed: Dec. 23, 1966

[21] Appl. No.: 604,199

[30] Foreign Application Priority Data

Dec. 25, 1965 Japan..................................40/80258

[52] U.S. Cl. ...............................................195/28 N, 195/96
[51] Int. Cl. .........................................................C12d 13/06
[58] Field of Search ...............................195/28, 28 N, 3, 3 H

[56] References Cited

UNITED STATES PATENTS 3,308,035  3/1967  Dours et al. ...............................195/28
3,355,296  11/1967  Perkins et al. ...............................195/3
3,139,385  6/1964  Ogata et al...........................195/28 N
3,222,258  12/1965  Fizuka et al............................195/3 H

OTHER PUBLICATIONS

Foster, Antonie Van Leeuwenhoek, J. Microbiol, Serol., Vol. 28, pages 243– 247 (1962)

Primary Examiner—Alvin E. Tanenholtz
Attorney—Wenderoth, Lind & Ponack

[57] ABSTRACT

5'-nucleotides are produced by culturing hydrocarbons-assimilating micro-organisms belonging to the genera *Corynebacterium*, *Brevibacterium*, *Pseudomonas* or *Arthrobacter* in a culture medium containing hydrocarbons as carbon sources and subsequently suspending the resultant grown micro-organisms in alkaline aqueous solution of a pH in the range of 8.0 to 10.5.

12 Claims, No Drawings

METHOD FOR THE PRODUCTION OF 5'-NUCLEOTIDES

This invention relates to a method for the production of 5'-nucleotides. More particularly, this invention relates to a method for producing 5'-nucleotides which comprises culturing a micro-organism which belongs to a genus selected from the group consisting of the genus *Corynebacterium*, the genus *Brevibacterium*, the genus *Pseudomonas* and the genus *Arthrobacter* and which is capable of assimilating hydrocarbons, onto a culture medium comprising a carbon source consisting mainly of hydrocarbons containing not less than 10 percent (volume/volume) of normal paraffins having a carbon atom number within the range from nine to 23, suspending the resultant grown micro-organism in an alkaline aqueous solution of a pH of about 8.0 to about 10.5 at a temperature of about 30° C. to about 45° C. until the intracellular ribonucleic acid of the micro-organism is degraded into 5'-nucleotides which come out of the cells and are accumulated in the medium, and recovering therefrom thus accumulated 5'-nucleotides.

Production of 5'-nucleotides by employing micro-organisms has hitherto generally been effected through either of the following two processes: (1) ribonucleic acid is hydrolyzed by the action of phosphodiesterase produces by micro-organisms or (2) micro-organisms capable of producing 5'-nucleotides during the incubation and of accumulating the same in the medium are incubated under conditions suitable for the purpose. However, these known processes are necessarily accompanied with disadvantages when effected on an industrially large scale. More specifically, in the former process, a micro-organism employed as the source of ribonucleic acid e.g. yeast and a micro-organism capable of producing the enzyme-system to hydrolyze the ribonucleic acid into 5'-nucleotides must be separately cultured in different culture media. In the latter process as the objective 5'-nucleotides are accumulated during the incubation of the micro-organism, the concentration of so-accumulated 5'-nucleotides is necessarily rather low.

Recently, Yoshio Nakao (one of the present inventors) et al., provided a method for producing 5'-nucleotides which comprises culturing a micro-organism in a culture medium and suspending the cultivated micro-organism in alkaline aqueous solution of pH 7.5 to 12 at a temperature of 30° to 45° C. until the intracellular ribonucleic acid of the micro-organism is degraded into 5'-nucleotides which come out of the cells and are accumulated in the medium (U.S. Pat. No. 3,139,385). This method is more fit for practical application to an industrial production of 5'-nucleotides than the hitherto employed processes mentioned above, since 5'-nucleotides can be obtained directly from cells or mycelia of the micro-organism, the nucleotides being produced from the intracellular ribonucleic acid of the micro-organism by the action of co-existing enzyme-system. This method, however, must be carried out with the use of rather relatively expensive carbohydrates such as glucose, molasses, and starch hydrolyzate as the carbon sources, similarly to the hitherto-employed processes for producing 5'-nucleotides.

The present invention avoids the use of expensive carbon sources by employing micro-organisms belonging to genus *Corynebacterium*, genus *Brevibacterium*, genus *Pseudomonas* or genus *Arthrobacter*, which can especially assimilate normal paraffins having a carbon atom number within the range from nine to 23, which are readily available at a relatively low cost as carbon source among many kinds of hydrocarbons. Further, when these micro-organisms are incubated in a culture medium wherein the carbon source consists mainly of hydrocarbons containing the said normal paraffins, they can remarkably propagate in the medium to form culture broth containing a considerably large amount of cells, and, therefore, 5'-nucleotides can be obtained in a good yield by suspending thus sufficiently grown micro-organisms in alkaline aqueous solution under specific conditions as explained hereinafter.

It is thus the main object of this invention to provide a new and useful method for the production of 5'nucleotides, especially suitable for the production thereof on an industrially large scale.

Another object of the invention is an improvement in minimizing troublesome procedures and disadvantages necessarily encountered in effecting the hitherto-known processes for the production of 5'-nucleotides.

The micro-organisms to be used for the purpose of the present invention can be selected from those which belong to genus *Corynebacterium*, genus *Brevibacterium*, genus *Pseudomonas* or genus *Arthrobacter* and which can assimilate hydrocarbons. Such micro-organisms are exemplified by *Corynebacterium hydrocarbonclastus*, *Corynebacterium fascians*, *Brevibacterium alkanolyticum nov. sp.*, *Brevibacterium leucinophagum*, *Pseudomonas alkanolytica nov. sp.*, *Pseudomonas aeruginosa* and *Arthrobacter simplex*.

Both *Brevibacterium alkanolyticum nov. sp.* and *Pseudomonas alkanolytica nov. sp.* are novel micro-organisms which were isolated from soil and confirmed as novel species by the present inventors.

The *Pseudomonas alkanolytica nov. sp.* has the following characteristics which are confirmed according to the methods described in the Manual of Microbiological Methods, Society of American Bacteriologists (1957). I. Morphological characteristic:

Small rods near to cocci, 0.9 by 1.1 microns. Non-motile and non-sporulating. Gram-negative.

II. Cultural characteristics:

1. Nutrient agar plate:Untransparent greyish white, circular, smooth, entire, convex surface.
2. Nutrient agar slant: Growth abundant, greyish white, spreading.
3. Nutrient agar stab:
Growth on surface, filiform,
4. Nutrient broth:
Turbidity with sediment, non-formation of velum.

III. Physiological characteristics:

1. pH relations: Growth at pH 5.0 to 9.0, optimum about 7.0.
2. Temperature relations: Growth at 15 to 37° C., optimum about 37° C.
3. $O_2$ relations: aerobic.
4. Gelatin: No liquefaction.
5. Starch assimilation: Negative.
6. Urea assimilation: Negative.
7. Indol: Not produced.
8. Ammonia: Not produced.
9. Hydrogen sulfide: Not produced.
10. Nitrates reduction: Nitrites produced from nitrates.
11. Catalase: Positive.
12. Acetylmethylcarbinol: Not produced.
13. Methyl red test: Negative.
14. Litmus milk: Coagulated and acidic, litmus not reduced.
15. Acid but no gas from glucose, galactose, mannose, xylose. No acid and no gas from fructose, arabinose, sucrose, lactose, maltose, mannitol, sorbitol, glycerol.

Detailed comparison of the above mentioned characteristics with the descriptions in "Bergey's Manual of Determinative Bacteriology, Seventh Edition" reveals that this micro-organism belongs to the genus *Pseudomonas*. But this micro-organism is quite different from any of the species belonging to Pseudomonas described in the above-mentioned reference in their microbial characteristics. Therefore, this micro-organism is concluded to be classified as a novel species belonging to genus *Pseudomonas*, and has been named *Pseudomonas alkanolytica* by the present inventors.

A specimen of the *Pseudomonas alkanolytica nov. sp.* has been deposited at American Type Culture Collection, Maryland, U.S.A., under the accession number ATCC 21034.

The *Brevibacterium alkanolyticum nov. sp.* has the following characteristics, which are confirmed according to the method described in the Manual of Microbiological Methods described above.

I. Morphological characteristic:

Small rods, 0.8 to 1.0 by 1.0 to 1.2. Non-motile and non-sporulating. Grampositive.

II. Cultural characteristics:
1. Nutrient agar plate:
Untransparent greyish white to pale orange color.
2. Nutrient agar slant;:
Greyish white to pale orange color, Filiform.
3. Nutrient agar stab:
Growth on surface, Filiform.
4. Nutrient broth:
Turbidity with sediment.
Non-formation of the velum.

III. Physiological characteristics:
1. pH relations: Growth at pH 5.0 to 9.0, optimum about 7.0.
2. Temperature relations: Growth at 15 to 37° C., optimum about 37° C.
3. $O_2$ relations: areobic.
4. Gelatin: No liquification.
5. Starch assimilation: Negative.
6. Urea assimilation: Negative.
7. Indol: Not produced.
8. Ammonia: Not produced.
9. Hydrogen sulfide: Not produced.
10. Nitrates reduction: Nitrites produced from nitrates.
11. Catalase: Positive.
12. Acetylmethylcarbinol: Not produced.
13. Methyl red test: Negative.
14. Litmus milk: No change
15. No acid and no gas from glucose, fructose, galactose, mannose, xylose, arabinose, sucrose, lactose, maltose, mannitol, sorbitol, glycerol.

Detailed comparison of the above-mentioned characteristics with the description in the "Bergey's Manual of Bacteriology, Seventh Edition," reveals that this micro-organism belongs to the genus Brevibacterium, judged from the such characteristics as Gram-positive, cells without endospores, straight unbranched rods, pale orange pigments, pleom or plism was not observed. But the present micro-organism is quite different from any of species belonging to Pseudomonas described in the above-mentioned reference in their characteristics. Therefore, the present micro-organism is concluded to be classified as a novel species belonging to genus Brevibacterium, and has been named Brevibacterium alkanolyticum. A specimen of Brevibacterium alkanolyticum nov. sp. was deposited at American Type Culture Collection under the accession number ATCC 21033.

In carrying out the method of this invention, it is generally preferable to employ a liquid culture medium, and the incubation is carried out aerobically, i.e. with aeration, under static or submerged conditions. The culture medium employed in this invention is required to contain, as a carbon source, hydrocarbons containing normal paraffins of a carbon atom number within the range of nine to 23.

The amount of the said normal paraffins contained in the hydrocarbons should not be less than 10 volume per cent of the entire amount of hydrocarbons employed, from the view of the growth of the micro-organism.

The normal paraffins may be either those which consist of only one kind of normal paraffins of a carbon atom number within the range of nine to 23 or those which consist of two or more kinds of normal paraffins, each having a carbon atom number within the range of nine to 23. Hydrocarbons consisting only of the said normal paraffins are most advantageously employed in the present invention. But the hydrocarbon source in the present invention may, occasionally, contain other hydrocarbons, (e.g., branched paraffins, olefins, cyclic paraffins, aromatic hydrocarbon, normal paraffins of 1 to 8 or not less than 24 carbon atoms, etc.) than the normal paraffins of carbon atom numbers within the range of nine to 23, as long as the normal paraffins of carbon atom number within the range of nine to 23 are included as a whole in an amount of not less than 10 percent (volume/volume).

From the viewpoints of both the growth of the micro-organism and yield of the objective 5'-nucleotides, the hydrocarbons are generally used in such an amount as to make the concentration of the normal paraffins of carbon atom numbers within the range of nine to 23 in the culture medium, as a whole, about 3 to 20 percent (volume/volume).

As these hydrocarbons are scarcely soluble in water, the addition thereof to an aqueous culture medium is practically carried out under stirring or shaking to prepare a suspension containing them as very fine particles. If desired, a suspending agent, e.g. a surfactant of the type of polyoxy-ethylene sorbitan monostearate (commercially available as Tween-60) may be employed. It is sufficient for the present method to use only these hydrocarbons as carbon sources but, if desired, commonly employable carbon sources such as carbohydrate (e.g., glucose) may be used together with the hydrocarbons.

The culture medium should contain nitrogen source(s) as well as the hydrocarbons as nutrients. As the nitrogen source(s), any of those used in the hitherto-known methods may be employed, and these may be exemplified by peptone, soybean powder, cornsteep liquor, meat extract, ammonium salts, organic or inorganic nitrogen compounds or nitrogen-containing materials. Furthermore, a small quantity of inorganic salts such as sodium chloride, potassium phosphate, salts of metals e.g. magnesium, zinc, iron, manganese, etc. may be added to the medium.

The incubation is usually carried out for about 6 to about 30 hours at a temperature of about 25° to about 40° C., and the optimum period of the incubation varies in accordance with such factors as the kind of micro-organism, the composition of the media, the temperature, whether the medium is agitated or not, etc.

The micro-organisms thus cultivated and grown contain ribonucleic acid in their cells in a quantity of about 10 to 15 percent to their dried body weight.

In the next stage, the resulting raw cells of the micro-organism is kept suspended in alkaline aqueous solution of a pH of about 8.0 to about 10.5. For this purpose, the micro-organism may or may not be separated from the culture medium. When separated from the culture medium, it is then suspended in an aqueous medium. As the aqueous medium, those are usable which are prepared by dissolving solutes such as glycine, tris-(hydroxymethyl)aminomethane, sodium chloride, ammonium chloride, potassium chloride, borax, sodium phosphates, potassium phosphates, ammonium sulfate, sodium acetate, urea, or the like in water so as the make their final molar concentration about 0.1 to 0.5. A known buffer solution such as tris-(hydroxymethyl)-aminomethane buffer solution or glycine-sodium hydroxide buffer solution which is adjusted to have a 0.1 to 0.5 molar concentration of the solutes and a pH of 8.0 to 10.5, may be conveniently employed as the aqueous medium. When an aqueous medium, pH of which is out of the range mentioned above, is employed, the yield of the desired 5'-nucleotides is relatively low. Thus prepared suspension is usually allowed to stand or shaken or agitated for 1 to 10 hours at a temperature of about 30° to 45° C. It may, in some cases, be preferable to subject the micro-organism, prior to the suspension process, to a physical treatment such as freezing for the purpose of somewhat damaging the envelopes of the cells. In this manner, the period required for the suspension process can be shortened.

When the micro-organism is subjected to alkaline pH without being separated from the culture medium, the culture medium should be adjusted to an alkaline pH of about 8.0 to about 10.5, for example, by the addition of such solutes as enumerated in the preceding paragraph. Further treatment may be carried out in a similar manner to the above-mentioned suspension process.

It can result in shortening the period required for the accumulation of 5'-nucleotides in the medium to treat sufficiently grown micro-organisms with a chemical agent such as phenol, cresol, sodium deoxycholate, etc., so as to damage the envelopes of the cells before or while the micro-organism is kept suspended in the medium.

The addition of the chemical agent providing polybasic anions such as phosphates, pyrophosphates, polyphosphates, arsenates, etc. to the medium in which the micro-organism is kept suspended often results in enhanced yield of 5'-nucleotides.

Furthermore, it may result in enhanced yield of 5'-nucleotide, to treat the sufficiently grown micro-organism with a surfactant such as cetyltrimethylammonium bromide, sodium alkylarylsulfonate, polyoxyethylene lauryl ether, or an organic solvent such as butyl alcohol, amyl alcohol, acetone, butyl acetate, before or while the micro-organism is kept suspended in the medium.

According to the said treatments, 80 to 100 percent of the intracellular ribonucleic acid disappears and 60 to 90 percent of the same is changed into 5'-nucleotides such as 5'-adenylic acid, 5'-guanylic acid, 5'-cytidylic acid and 5'-uridylic acid, which come out of the cells into the surrounding medium and accumulate therein. In the case of the micro-organism producing 5'-adenylic acid deaminase, 5'-inosinic acid may be accumulated in place of 5'-adenylic acid.

Following examples are merely intended to illustrate presently preferred embodiments of the present invention and not to restrict the scope of the latter.

Throughout the present specification as well as in the following examples, the abbreviations "g," "ml," "l" and "°C." respectively refer to gram(s), milliliter(s), and degrees Centigrade; and percentages are volume/volume unless otherwise specified.

EXAMPLE 1

*Corynebacterium hydrocarboclastus* (ATCC 21035) is inoculated in 150 ml. of the culture medium mentioned in the following Table 1, and the medium is incubated under shaking at 30° C. for 20 hours.

TABLE 1

| | |
|---|---|
| mixture of normal paraffins* | 100 ml. |
| ammonium nitrate | 10 g. |
| $KH_2PO_4$ | 20 g. |
| $K_2HPO_4$ | 5 g. |
| $MgSO_4 \cdot 7H_2O$ | 1 g. |
| $MnSO_4 \cdot 7H_2O$ | 0.01 g. |
| $ZnSO_4 \cdot 7H_2O$ | 0.01 g. |
| $FeSO_4 \cdot 7H_2O$ | 0.01 g. |
| yeast extract | 10 g. |
| water | up to 1 liter |
| | pH 7.0 |

* consisting of normal paraffins of carbon atom numbers within the range from 11 to 23, containing the specific normal paraffins in the following percentage relative to the whole weight of the mixture and having a boiling range from about 262° C. to about 349° C.:

| Carbon atom number | percent |
|---|---|
| 11 | 0.2 |
| 12 | 0.5 |
| 13 | 1.2 |
| 14 | 4.1 |
| 15 | 10.8 |
| 16 | 13.8 |
| 17 | 15.3 |
| 18 | 14.4 |
| 19 | 12.3 |
| 20 | 11.3 |
| 21 | 8.7 |
| 22 | 5.6 |
| 23 | 2.9 |

The resultant culture broth is inoculated in 2.5 liters of the culture medium of the same composition as mentioned above, and incubated with aeration and agitation at 30° C. for 15 hours, the medium being kept at pH 7.0 during the period of the incubation with aqueous ammonia. After the incubation the resulting cells are collected. Thus obtained raw cells correspond to 100 g. in their dried condition and contain 12 percent of ribonucleic acid relative to the dried cell weight. The raw cells are suspended in 1 liter of a 0.2 molar glycine-sodium hydroxide buffer solution adjusted at pH 9.8. The suspension is agitated for 3 hours at 37° C., and then filtered to remove the cells. The filtrate is adjusted to pH 2.0 with hydrochloric acid, and allowed to pass through a column packed with activated charcoal whereupon the 5'-nucleotides are adsorbed on the charcoal. The 5'-nucleotides on the charcoal are eluted out with ethanol alkalified with ammonia. The nucleotides in the effluent are purified by the use of anion exchange resin (Dowex 1, Dow Chemical Co., Ltd,. U.S.A.) to give 2.5 g. of 5'-adenylic acid, 2.2 g. of 5'-guanylic acid, 2.1 g. of 5'-cytidylic acid and 2.0 grams of 5'-uridylic acid.

In the process of this example, when the incubation process is carried out in a culture medium containing 100 g. of glucose in place of the mixture of normal paraffins, less yield of the 5'-nucleotides, i.e., 1.2 g. of 5'-adenylic acid, 1.2 g. of 5'-guanylic acid, 1.1 g. of 5'-cytidylic acid and 1.1 g. of 5'-uridylic acid are obtained.

EXAMPLE 2

*Corynebacterium fascians* (ATCC 12974) is inoculated in 100 ml. of the culture medium mentioned in the following Table 2, and the medium is incubated under shaking at 28° C. for 20 hours.

TABLE 2

| | |
|---|---|
| mixture of normal paraffins* | 100 ml. |
| ammonium nitrate | 10 g. |
| $K_2HPO_4$ | 20 g. |
| $KH_2PO_4$ | 6 g. |
| $MgSO_4 \cdot 7H_2O$ | 1 g. |
| $MnSO_4 \cdot 7H_2O$ | 0.01 g. |
| $FeSO_4 \cdot 7H_2O$ | 0.1 g. |
| cornsteep liquor | 5 g. |
| water | up to 1 liter |
| | pH 7.0 |

* same as mentioned in Table 1.

The resultant culture broth is inoculated in 1.0 liter of the culture medium of the same composition mentioned above, and incubated with aeration and agitation at 30° C. for 20 hours, the medium being kept at pH 7.0 during period of the incubation with aqueous ammonia. After the incubation, the resulting cells are collected. Thus obtained raw cells correspond to 40 g. in their dried condition and contain 11 percent of ribonucleic acid relative to the dried cell weight. The raw cells are suspended in 500 ml. of a 0.2 molar tris-(hydroxymethyl)aminomethane buffer solution adjusted at pH 9.0. The suspension is agitated for 5 hours at 37° C., and then filtered to be separated into cells and filtrate. The filtrate is treated after the manner described in Example 1 to give 0.95 g of 5'-adenylic acid, 0.90 g. of 5'-guanylic acid, 0.85 g. of 5'-cytidylic acid and 0.85 g of 5'-uridylic acid.

In the process of this example, when the incubation process is carried out in the culture medium containing 100 g. of glucose in place of the mixture of normal paraffins, less yield of the 5'-nucleotides, i.e. 0.5 g. of 5'-adenylic acid, 0.45 g. of 5'-guanylic acid, 0.40 g. of 5'-cytidylic acid and 0.40 g. of 5'-uridylic acid are obtained.

EXAMPLE 3

*Brevibacterium alkanolyticum nov. sp.* (ATCC 21033) is inoculated in 150 ml of the culture medium of the same composition as described in Table 1 of Example 1, and the medium is incubated under shaking at 30° C. for 24 hours.

The resultant culture broth is inoculated in 2.5 liters of the culture medium of the same composition as mentioned above, and incubated with aeration and agitation at 30° C. for 24 hours, the medium being kept at pH 7.0 with aqueous ammonia during the incubation. After the inoculation, the resulting cells are collected. Thus obtained raw cells correspond to 125 g. in their dried condition and contain 12 percent of ribonucleic acid relative to the dried cell weight. The raw cells are suspended in 1 liter of a 0.15 molar glycine-sodium hydroxide buffer solution adjusted at pH 9.8. The suspension is agitated for 4 hours at 37° C. and then filtered. The resultant filtrate is treated after the manner described in Example 1 to given 3.0 g. of 5'-adenylic acid, 2.7 g. of 5'-guanylic acid, 2.5 g. of 5'-cytidylic acid and 2.4 g. of 5'-uridylic acid.

In the process of this example, when the incubation process is carried out in the culture medium containing 100 g. of glucose in place of the mixture of normal paraffins, less yield of the 5'-nucleotides, i.e. 1.7 g. of 5'-adenylic acid, 1.5 g. of 5'-guanylic acid, 1.4 g. of 5'-cytidylic acid and 1.4 g. of 5'-uridylic acid are obtained.

EXAMPLE 4

*Brevibacterium leucinophagum* (ATCC 13809) is inoculated in 100 ml of the culture medium of the same composition as described in Table 2 of Example 2, and the medium s incubated under shaking at 30° C. for 20 hours.

The resultant culture broth is inoculated in 1 liter of the culture medium of the same composition as mentioned above, and incubated with aeration and agitation at 30° C. for 15 hours, the medium being kept at pH 7.0 with aqueous ammonia during the incubation. After the incubation, the resulting cells are collected. Thus obtained raw cells correspond to 45 g. in their dried condition and contain 11.5 percent of ribonucleic acid relative to the dried cell weight. The raw cells are suspended in 500 ml. of 0.2 molar glycine-sodium hydroxide buffer solution adjusted at pH 9.8. The suspension is agitated for 4 hours at 37° C. and then filtered. The resultant filtrate is treated after the manner described in Example 1 to give 1.1 g. of 5'-adenylic acid, 1.0 g. of 5'-guanylic acid, 1.0 g. of 5'-cytidylic acid and 0.95 g. of 5'-uridylic acid.

In the process of this example, when the incubation process is carried out in the culture medium containing 100 g. of glucose in place of the mixture of normal paraffins, less yield of the 5'-nucleotides, i.e. 0.6 g. of 5'-adenylic acid, 0.55 g. of 5'-guanylic acid, 0.50 g. of 5'-cytidylic acid and 0.48 g. of 5'-uridylic acid are obtained.

EXAMPLE 5

*Pseudomonas alkanolytica nov. sp.* (ATCC 21034) is inoculated in 100 ml. of the culture medium of the same composition as described in Table 2 of Example 2, and the medium is incubated under shaking at 28° C. for 20 hours.

The resultant culture broth is inoculated in 1 liter of the culture medium of the same composition as mentioned above, and incubated with aeration and agitation at 30° C. for 12 hours, the medium being kept at pH 7.0 with aqueous ammonia during the incubation. After the incubation, the resulting cells are collected. Thus obtained raw cells correspond to 65 g. in their dried condition and contain 12 percent of ribonucleic acid relative to the dried cell weight. The raw cells are suspended in 500 ml. of a 0.2 molar glycine-sodium hydroxide buffer solution adjusted at pH 9.8. The suspension is agitated for 3 hours at 37° C. and then filtered. The resultant filtrate is treated after the manner described in Example 1 to give 1.6 g. of 5'-adenylic acid, 1.4 g. of 5'-guanylic acid, 1.3 g. of 5'-cytidylic acid and 1.2 g. of 5'-uridylic acid.

IN the process of this example when the separated raw cells are suspended in the buffer solution after being kept frozen overnight at −25° C. and thawed, an enhanced yield of the 5'-nucleotide, i.e. 1.8 g. of 5'-adenylic acid, 1.6 g. of 5'-guanylic acid, 1.6 g. of 5'-cytidylic acid and 1.5 g. of 5'-uridylic acid are obtained; when the separated raw cells are suspended in the buffer solution with 10 ml of a 20 percent (weight/volume) aqueous solution of cetyltrimethylammonium bromide, an enhanced yield of the 5'-nucleotides, i.e. 1.8 g. of 5'-adenylic acid, 1.6 g. of 5'-guanylic acid, 1.5 g. of 5'-cytidylic acid and 1.4 g. of 5'-uridylic acid are obtained, and when the separated raw cells are suspended in the buffer solution supplemented with 10 ml of acetone, an enhanced yield of the 5'-nucleotides, i.e. 1.7 g. of 5'-adenylic acid, 1.65 g. of 5'-guanylic acid, 1.5 g. of 5'-cytidylic acid and 1.4 g. of 5'-uridylic acid are obtained.

EXAMPLE 6

*Pseudomonas alkanolytica nov. sp.* (ATCC 21034) is inoculated in 100 ml. of the culture medium mentioned in the following Table 3, and the medium is incubated under shaking at 28° C. for 20 hours.

TABLE 3

| | |
|---|---|
| mixture of normal paraffins* | 100 ml |
| ammonium nitrate | 10 g. |
| $K_2HPO_4$ | 20 g. |
| $KH_2PO_4$ | 6 g. |
| $MgSO_4 \cdot 7H_2O$ | 1 g. |
| $MnSO_4 \cdot 7H_2O$ | 0.01 g. |
| $FeSO_4 \cdot 7H_2O$ | 0.1 g. |
| cornsteep liquor | 5 g. |
| water | up to 1 liter |
| | pH 7.0 |

* Consisting of normal paraffins of carbon atom numbers within the range from 9 to 15, containing the specific normal paraffins in the following percentage relative to the whole weight of the mixture and having a boiling range from about 172 to 266° C.

| Carbon atom number | percent |
|---|---|
| 9 | 11.4 |
| 10 | 19.2 |
| 11 | 23.8 |
| 12 | 23.9 |
| 13 | 18.9 |
| 14 | 2.4 |
| 15 | 0.5 |

The resultant culture broth is inoculated in 1.0 liter of the culture medium of the same composition as mentioned above, and incubated with aeration and agitation at 30° C. for 12 hours, the medium being kept at pH 7.0 with aqueous ammonia during the incubation. After the incubation, there are added to the broth glycine and urea so as to make their final concentrations 0.05 molar and 0.2 molar, respectively. After being adjusted to pH 8.5 with sodium hydroxide, the resultant mixture is agitated for additional 3 hours. Then the mixture is filtered to give filtrate, which is subjected to purification process by adsorption on activated charcoal, elution therefrom, etc. As the result, 1.5 g. of 5'-adenylic acid, 1.4 g. of 5'-guanylic acid, 1.4 g of 5'-cytidylic acid and 1.3 g. of 5'-uridylic acid are obtained.

EXAMPLE 7

*Pseudonmonas aeruginosa* (ATCC 21036) is incubated in 1 liter of the culture medium of the same composition as described in Table 2 of Example 2 with aeration and agitation at 30° C. for 24 hours, the medium being kept at pH 7.0 with aqueous ammonia during the incubation. After the incubation, the resulting cells are collected. Thus obtained raw cells correspond to 30 g. in their dried condition and contain 12 percent of ribonucleic acid relative to the dried cell weight. The raw cells are suspended in 500 ml of a 0.2 molar glycine-sodium hydroxide buffer solution of pH 7.8 which is supplemented with 10 ml of phenol. The suspension is agitated for 3 hours at 37° C. and then filtered. From the filtrate of 0.8 g. of 5'-adenylic acid, 0.75 g. of 5'-guanylic acid, 0.7 g. of 5'-cytidylic acid and 0.7 g. of 5'-uridylic acid are obtained.

EXAMPLE 8

*Arthrobacter simplex* (ATCC 6946) is incubated in 1 liter of the culture medium of the same composition as described in Table 2 of Example 2 with aeration and agitation, at 30° C. for 20 hours, the medium being kept at pH 7.0 with addition of aqueous ammonia during the incubation. After the incubation, the resulting cells are collected. Thus obtained raw cells correspond to 40 g. in their dried condition and contain 12 percent of ribonucleic acid relative to the dried cell weight.

The raw cells are suspended in 500 ml. of a 0.2 molar tris(hydroxymethyl)aminomethane buffer solution which is supplemented with 10 g. of potassium hydrogen phosphate. The suspension is agitated for 5 hours and then filtered. From the filtrate 0.9 g. of 5'-adenylic acid, 0.85 g. of 5'-gunaylic acid, 0.8 g. of 5'-cytidylic acid and 0.7 g. of 5'-uridylic acid are obtained.

We claim:

1. In a method for producing 5'-ribonucleotides, which comprises culturing a microorganism in a culture medium, suspending the cultured microorganism in alkaline aqueous solution at a temperature of 30° to 45° C. until the intracellular ribonucleic acid of the microorganism is degraded into 5'-ribonucleotides which come out of the cells and are accumulated in the medium, and recovering therefrom thus-accumulated 5'-ribonucleotides, the improvement wherein the microorganism is a hydrocarbon-assimilating microorganism selected from the group consisting of *Corynebacterium hydrocarboclastus*, *Corynebacterium fascians*, *Brevibacterium alkanolyticum*, *Brevibacterium leucinophagum*, *Pseudomonas alkanolytica*, and *Arthrobacter simplex*, the culture medium comprises a carbon source consisting mainly of hydrocarbons containing not less than 10 percent (volume/volume) of normal paraffins, having a carbon atom number within the range from nine to 23, and the pH of the alkaline aqueous solution is about 8.0 to about 10.5.

2. The improvement according to claim 1, wherein the culture medium contains about 3 to about 20 percent (volume/volume) of said normal paraffins.

3. The improvement according to claim 1, wherein the hydrocarbons are a mixture of normal paraffins having a carbon atom number within the range from 11 to 23, the mixture having a boiling range from about 262° C. to about 349° C.

4. The improvement according to claim 1, wherein the hydrocarbons are a mixture of normal paraffins having a carbon atom number within the range from nine to 15, the mixture having a boiling range from about 172° C. to about 266° C.

5. The improvement according to claim 1, wherein the alkaline aqueous solution is glycine-sodium hydroxide buffer solution of a pH of about 8.0 to about 10.5, about 0.1 the molar concentration of the solutes being from about 0.1 to about 0.5.

6. The improvement according to claim 1, wherein the alkaline aqueous solution is tris(hydroxymethyl)aminomethane buffer solution of a pH of about 8.0 to about 10.5, the molar concentration of the solutes being about 0.1 to about 0.5.

7. The improvement according to claim 1, wherein the microorganism is *Corynebacterium hydrocarboclastus* (ATCC 21035).

8. The improvement according to claim 1, wherein the microorganism is *Corynebacterium fascians* (ATCC 12974).

9. The improvement according to claim 1, wherein the microorganism is *Brevibacterium alkanolyticum nov. sp.* (ATCC 21033).

10. The improvement according to claim 1, wherein the microorganism is *Brevibacterium leucinophagum* (ATCC 13809).

11. The improvement according to claim 1, wherein the microorganism is *Pseudomonas alkanolytica nov. sp.* (ATCC 21034).

12. The improvement according to claim 1, wherein the microorganism is *Arthrobacter simplex* (ATCC 6946).

* * * * *